United States Patent [19]

Kaneko

[11] Patent Number: 4,802,016
[45] Date of Patent: Jan. 31, 1989

[54] VIDEO NOISE REDUCTION SYSTEM WITH SIGNAL EMPHASIS PRECEDING FM MODULATION UPPER-BAND LUMINANCE

[75] Inventor: Shinji Kaneko, Kanagawa, Japan
[73] Assignee: Sony Corporation, Tokyo, Japan
[21] Appl. No.: 31,551
[22] Filed: Mar. 30, 1987

[30] Foreign Application Priority Data

Apr. 8, 1986 [JP] Japan .................. 61-080886

[51] Int. Cl.$^4$ .............................................. H04N 9/81
[52] U.S. Cl. ..................... 358/315; 358/327; 358/334; 358/340; 360/33.1
[58] Field of Search ............... 358/310, 315, 320, 327, 358/334, 340, 36–37, 330, 904; 360/33.1

[56] References Cited

U.S. PATENT DOCUMENTS

| | | | |
|---|---|---|---|
| 2,717,931 | 9/1955 | Duke | 358/904 X |
| 2,892,017 | 6/1959 | Houghton | 358/334 X |
| 2,892,022 | 6/1959 | Houghton | 358/334 X |
| 3,946,431 | 3/1976 | Gantert | 358/334 X |
| 4,167,749 | 9/1979 | Burrus | 358/315 |
| 4,445,152 | 4/1984 | Karlock | 358/315 X |
| 4,481,547 | 11/1984 | Sato | 358/330 X |
| 4,533,961 | 8/1985 | Shibata et al. | 358/315 |
| 4,559,554 | 12/1985 | Nitta | 358/37 X |
| 4,647,983 | 3/1987 | Ota | 358/330 X |
| 4,658,305 | 4/1987 | Tsushima | 358/327 |

OTHER PUBLICATIONS

"Operational Amplifiers Design and Applications", by Jerald G. Graeme et al., 1971, pp. 251–258.

Primary Examiner—Raymond F. Cardillo
Assistant Examiner—W. R. Young
Attorney, Agent, or Firm—Lewis H. Eslinger; Donald S. Dowden

[57] ABSTRACT

A video noise reduction system for use in a video signal recording apparatus adapted to record red, blue and green primary color component video signals on a plurality of separate tracks of a magnetic recording medium. The component video signals are applied to a matrix circuit which produces a wide-band luminance signal. The video noise reduction system includes a band splitter circuit for splitting the wide-band luminance signal into an upper-band luminance signal and a lower-band luminance signal and an emphasis circuit for emphasizing the low level components of the upper-band luminance signal before the upper-band luminance signal is FM modulated. Since the emphasis circuit follows the band splitter circuit having a flat phase versus frequency characteristic, the video noise reduction circuit can reduce video noise without causing distortion of the frequency modulated video signal.

4 Claims, 4 Drawing Sheets

(A)

(B)

VIDEO NOISE REDUCTION SYSTEM WITH SIGNAL EMPHASIS PRECEDING FM MODULATION UPPER-BAND LUMINANCE

BACKGROUND OF THE INVENTION

This invention relates to a video noise reduction system for use in a recording apparatus adapted to record red, blue and green primary color component video signals on a plurality of separate tracks of a magnetic recording medium.

In high definition videotape recorders, component video signals are frequency modulated before they are recorded on a recording medium. Such frequency modulation may cause greater noise to be introduced to a higher frequency signal component to worsen the picture quality, particularly the resolution power. Although various approaches have been made to reduce video noise caused by frequency modulation, they are not sufficient at certain points.

SUMMARY OF THE INVENTION

It is, therefore, one object of the present invention to provide a simple and inexpensive video noise reduction system which can reduce video noise without causing distortion of the frequency modulated video signal.

There is provided, in accordance with the present invention, a video noise reduction system for use in a recording apparatus adapted to record red, blue and green primary color component video signals on a plurality of separate tracks of a magnetic recording medium. The system comprises means for FM modulating the red and blue primary color component video signals and recording the FM modulated signals on separate tracks of the magnetic recording medium, a matrix circuit for matrixing the red, blue and green primary color component video signals to provide a wide-band luminance signal, a band splitter circuit (10) connected to the matrix circuit for splitting the wide-band luminance signal into lower- and upper-band luminance signals, means connected to the band splitter circuit for emphasizing the low level component of the upper-band luminance signal to produce a level emphasizing upper-band luminance signal, an adder circuit for adding the lower-band luminance signal and the level emphasized upper-band luminance signal, means connected to the adder circuit for time-base expanding the added luminance signal and separating the time-base expanded luminance signal into narrow-band luminance signals, and means for FM modulating the narrow-band luminance signals and recording the FM modulated signals on separate tracks of the magnetic recording medium.

BRIEF DESCRIPTION OF THE DRAWINGS

This invention will be described in greater detail by reference to the following description taken in connection with the accompanying drawings, in which like reference numerals refer to the same or corresponding parts, and wherein.

DETAILED DESCRIPTION OF THE INVENTION

Figure 1:
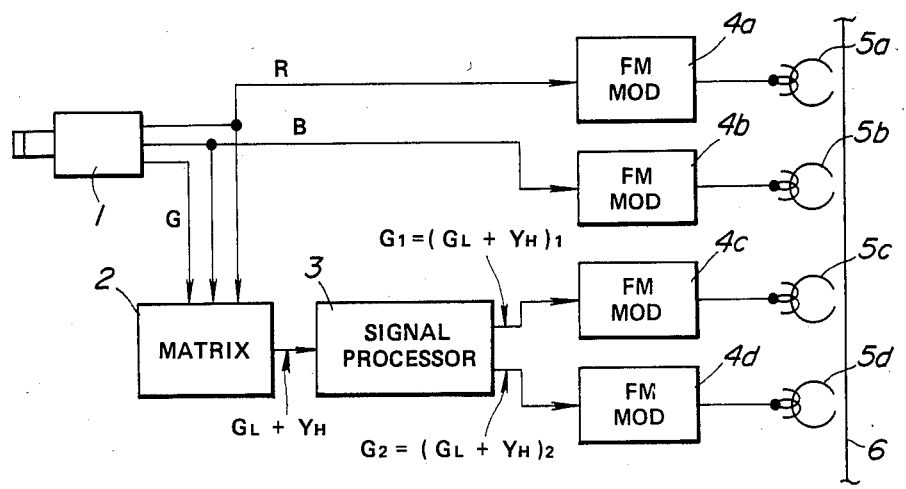
FIG. 1 is a schematic block diagram showing a prior art video signal recording apparatus.

Prior to the description of the preferred embodiment of the present invention, the prior art video signal recording apparatus of FIG. 1 is briefly described in order to specifically point out the difficulties attendant thereon.

Figure 2:
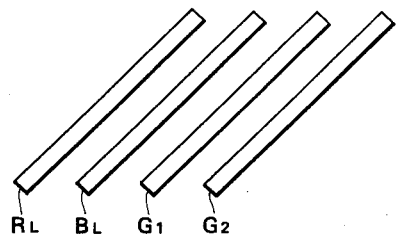
FIG. 2 is a fragmentary enlarged plan view of four adjacent recording tracks on a magnetic recording medium.

Referring to FIG. 1, the video signal recording apparatus, which is of the high definition VTR type recording information with 1125 or more horizontal scanning lines, is shown as receiving red, blue and green primary color component video signals R, B and G from a video source 1 such as a color television camera. The red primary color component video signal R is applied to an FM modulator 4a which converts it into a corresponding FM signal. This frequency modulated signal is applied to a first magnetic head 5a for recording the red primary color component video signal R on the first track, as shown in FIG. 2. Similarly, the blue primary color component video signal B is applied to an FM modulator 4b which converts it into a corresponding FM signal. This frequency modulated signal is applied to a second magnetic head 5b for recording the blue color component video signal B on the second track, as shown in FIG. 2.

Figure 3:
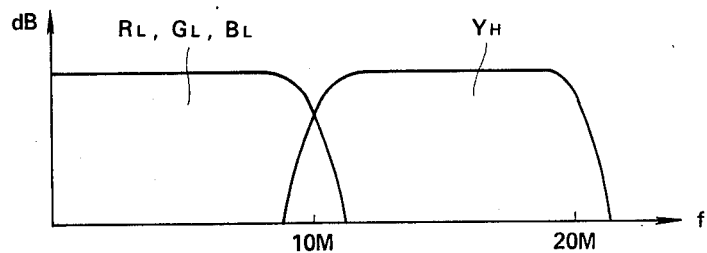
FIG. 3 is a graph showing the frequency bands of respective video signal components.

The three component video signals, R, B and G are applied to a matrix circuit 2 which matrixes them to produce a 20 MHz bandwidth wide-band luminance signal $G_L + Y_H$. The wide-band luminance signal includes a lower-band luminance signal $G_L$ and an upper-band luminance signal $Y_H$. The wide-band luminance signal $G_L + Y_H$ is applied to a signal processing circuit 3 which time-base expands it and splits the time-base expanded signal into first and second narrow-band luminance signals $G_1 = (G_L + Y_H)_1$ and $G_2 = (G_L + Y_H)_2$ having a doubled time axis and a halved bandwidth (10 MHz). The first narrow-band luminance signal $G_1$ is applied to an FM modulator 4c which converts it into a corresponding FM signal. This frequency modulated signal is applied to a third magnetic head 5c for recording the first narrow-band luminance signal $G_1 = (G_L + Y_H)_1$ on the third track, as shown in FIG. 2. Similarly, the second narrow-band luminance signal $G_2$ is applied to an FM modulator 4d which converts it into a corresponding FM signal. This frequency modulated signal is applied to a fourth magnetic head 5d for recording the second narrow-band luminance signal $G_2 = (G_L + Y_H)_2$ on the fourth track, as shown in FIG. 2. FIG. 3 is a diagram showing the bands corresponding to the respective components of the component video signals.

Figure 4:
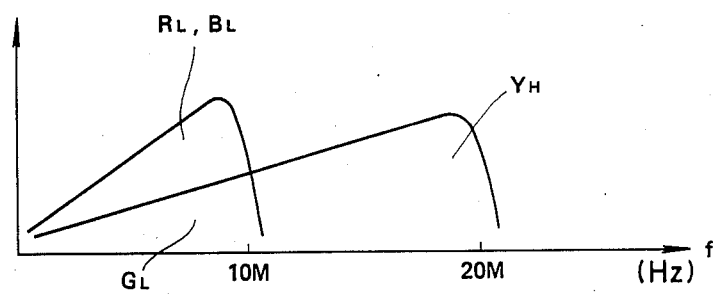
FIG. 4 is a graph showing the effect of frequency on noise level.

In high definition videotape recorders, component video signals are frequency modulated before they are recorded on a recording medium, as described previously. Such frequency modulation may be a cause of introduction of greater noise to a higher frequency signal component, as shown in FIG. 4, to worsen the picture quality, particularly the resolution power. Although various approaches have been made to reduce video noise caused by frequency modulation, they are insufficient at certain points. For example, an emphasizing technique has been employed to reduce video noise. However, this technique creates an over-modulation problem. Home videotape recorders employ a noise cancelling or reduction circuit to cancel noise by adding a high-frequency low-level signal derived from a video signal to the video signal having its phase reversed. However, this circuit exhibits a great loss of signal gain. Another type of noise reduction circuit reduces noise by utilizing line correlation. However, the circuit requires an expensive 1H delay line.

Figure 5:
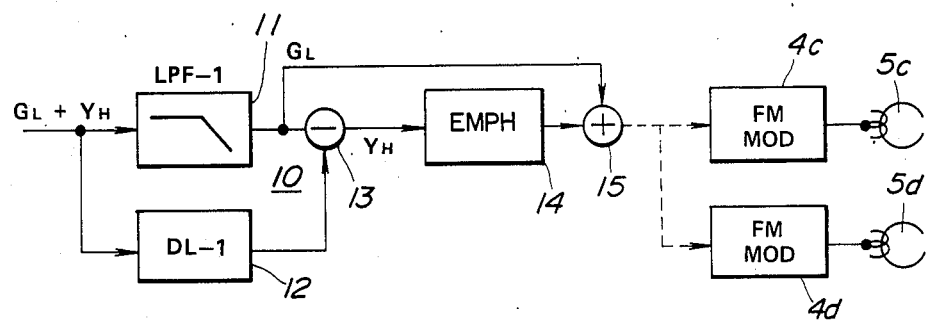
FIG. 5 is a schematic block diagram showing one embodiment of a video noise reduction circuit made in accordance with the invention.
Figure 6:
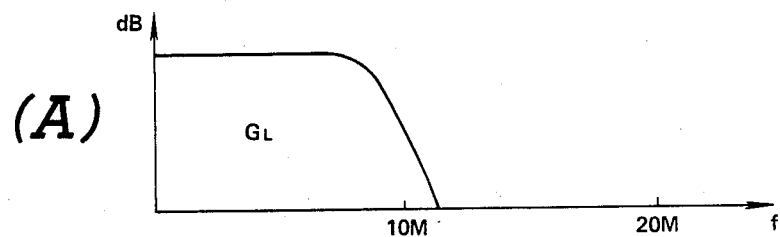
FIGS. 6A and 6B are graphs showing the frequency bands of lower- and upper-band luminance signals.
Figure 6:
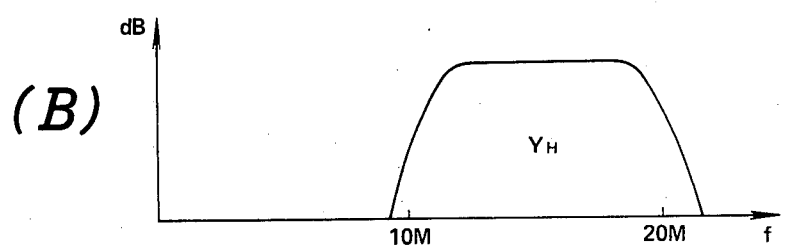

Referring to FIG. 5, there is illustrated one embodiment of a video noise reduction circuit made in accordance with the present invention. The video noise reduction circuit is shown as incorporated in the video signal recording apparatus of FIG. 1. The wide-band luminance signal $G_L+Y_H$ from the matrix circuit 2 (FIG. 1) is applied to a band splitter circuit 10. The band splitter circuit 10 includes a low pass filter 11, a delay circuit 12, and a subtracter 13. The low pass filter 11, which receives the wide-band luminance signal at its input, has a cutoff frequency of about 10 HMz and communicates the lower-band luminance signal $G_L$ to its output. The delay circuit 12, which is also connected to the matrix circuit 2, delays the wide-band luminance signal $G_L+Y_H$ a predetermined time corresponding to the time in which the lower-band luminance signal $G_L$ is delayed in the low pass filter 11 so that the wide-band luminance signal $G_L+Y_H$ can be timed to correspond to the lower-band luminance signal $G_L$. The subtracter 13, connected to the circuits 11 and 12, subtracts the lower-band luminance signal $G_L$ from the wide-band luminance signal $G_L+Y_H$ to produce an upper-band luminance signal $Y_H$. In such a manner, the band splitter circuit 10 splits the wide-band luminance signal $G_L+Y_H$ into a lower-band luminance signal $G_L$ and an upper-band luminance signal $Y_H$. The lower-band luminance signal $G_L$ has a frequency band below about 10 MHz, as shown in FIG. 6A, and the upper-band luminance signal $Y_H$ has a frequency band ranging from about 10 MHz to about 20 MHz, as shown in FIG. 6B.

Figure 7:
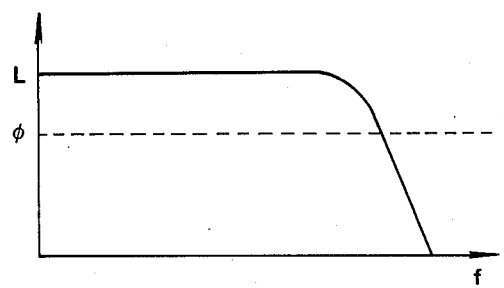
FIG. 7 is a graph showing the phase versus frequency characteristic of the band splitter circuit.

The band splitter circuit 10 has a flat phase (group delay) versus frequency characteristic within the frequency range below the cutoff frequency, as indicated by the broken line $\phi$ of FIG. 7, and tends to reduce noise without causing distortion of the frequency modulated video signals.

Figure 8A:
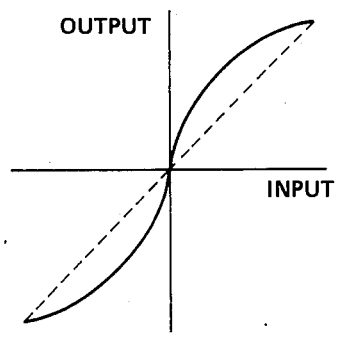
FIG. 8A is a graph showing the output versus input characteristic of the emphasis circuit.

Returning to FIG. 5, the upper-band luminance signal $Y_H$ is applied to a level emphasis circuit 14. The level emphasis circuit 14 has an output versus input characteristic, as shown in FIG. 8A, and tends to emphasize the low level components of the upper-band luminance signal $Y_H$. The level emphasized signal is applied from the level emphasis circuit 14 to an adder 15 which receives an additional input from the low pass filter 11. The adder 15 adds the level emphasized upper-band luminance signal to the lower-band luminance signal $G_L$. The output of the adder 15 is coupled to the signal processing circuit 3 (FIG. 1). As described previously, the signal processing circuit 3 time-base expands the added signal and splits the time-base expanded signal into first and second narrow-band luminance signals $G_1$ and $G_2$ having a double time axis and a halved bandwidth (10 MHz). The first narrow-band luminance signal $G_1$ is applied to the FM modulator 4c which converts it into a corresponding FM signal. This frequency modulated signal is applied to the third magnetic head 5c for recording the FM modulated first narrow-band luminance signal on the third track. Similarly, the second narrow-band luminance signal $G_2$ is applied to the FM modulator 4d which converts it into a corresponding FM signal. This frequency modulated signal is applied to the fourth magnetic head 5d for recording the second FM modulated narrow-band luminance signal on the fourth track.

Figure 9:
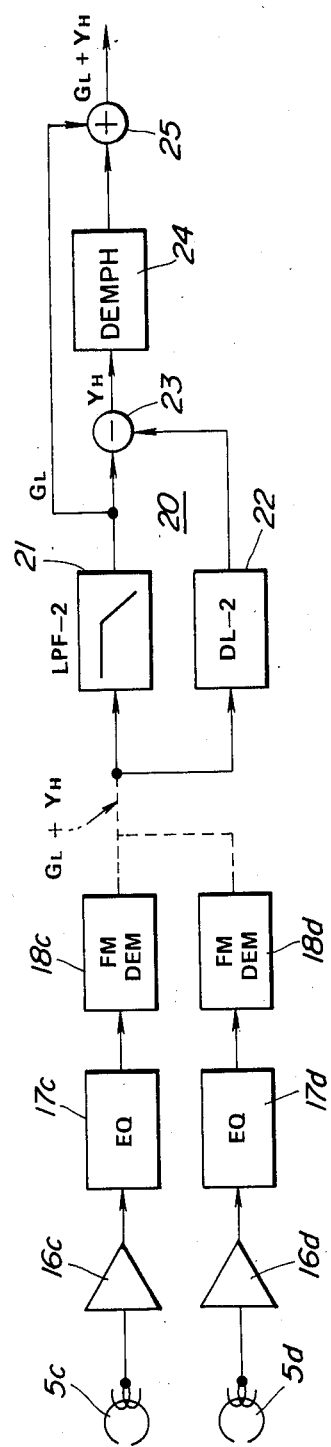
FIG. 9 is a schematic block diagram showing a video noise reduction circuit incorporated in a video signal reproducing apparatus.

Referring to FIG. 9, there is illustrated a video noise reduction circuit incorporated in a video signal reproducing apparatus. The magnetic head 5c reproduces the FM modulated first narrow-band signal recorded on the third track of the magnetic tape. The reproduced FM signal is fed through an amplifier circuit 16c and an equalizer circuit 17c to an FM demodulator 18c which provides a signal in the form of a first narrow-band signal corresponding to the modulation of the input FM signal. Similarly, the magnetic head 5d reproduces the FM modulated second narrow-band signal recorded on the fourth track of the magnetic tape. The reproduced FM signal is fed through an amplifier circuit 16d and an equalizer circuit 17d to an FM demodulator 18d which provides a signal in the form of a second narrow-band signal corresponding to the modulation of the input FM signal.

Figure 8B:
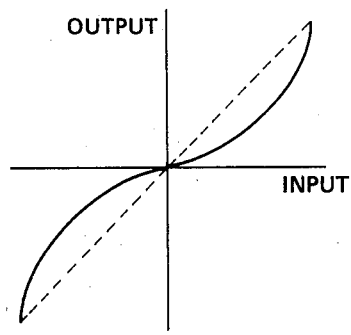
FIG. 8B is a graph showing the output versus input characteristic of the deemphasis circuit.

The first and second narrow-band signals are applied to a signal processing circuit which operates in a direction opposite to the operation of the signal processing circuit 3 (FIG. 1). That is, the signal processing circuit adds the first and second narrow-band signals and time-base compresses the resulting signal to produce a wide-band signal $G_L+Y_H$. The wide-band signal $G_L+Y_H$ is applied to a band splitter circuit 20 which is similar to the band splitter circuit 10 (FIG. 5). The band splitter circuit 20 includes a low pass filter 21, a delay circuit 22, and a subtracter 23. The low pass filter 21, which receives the wide-band signal at its input, has a cutoff frequency of about 10 MHz and passes the lower-band signal $G_L$ to its output. The delay circuit 22 delays the wide-band signal $G_L+Y_H$ a predetermined time corresponding to the time in which the lower-band signal $G_L$ is delayed by the low pass filter 21 so that the wide-band signal can be timed to correspond to the lower-band signal. The subtracter 23, connected to the circuit 21 and 22, subtracts the lower-band signal $G_L$ from the wide-band signal $G_L+Y_H$ to produce an upper-band signal $Y_H$. In such a manner, the band splitter circuit 20 splits the wide-band signal $G_L+Y_H$ into a lower-band signal $G_L$ and an upper-band signal $Y_H$. The upper-band signal $Y_H$ is applied to a level deemphasis circuit 24. The level deemphasis circuit 24 has an output versus input characteristic, as shown in FIG. 8B, which tends to deemphasize the low level components of the upper-band signal $V_H$. The level deemphasized signal is applied from the level deemphasis circuit 24 to an adder 25 which receives an additional input from the low pass filter 21. The adder 25 adds the level deemphasized upper-band signal to the lower-band signal $G_L$ to produce a wide-band signal $G_L + Y_H$ which corresponds to the wide-band luminance signal produced at the output of the matrix circuit 2 (FIG. 1).

As can be seen from the foregoing, the invention provides a video noise reduction circuit 6 which reduces video noise by employing an emphasis circuit 14 for emphasizing the low level components of the upper-band luminance signal before the wide-band luminance signal is FM modulated in a recording mode and a deemphasis circuit 24 for deemphasizing the low level components of the FM demodulated signal in a reproducing mode. Although the emphasis and deemphasis circuits 14 and 24 are nonlinear circuits, they follow respective band splitter circuits 10 and 20 having a flat phase versus frequency characteristic. Therefore, the video noise reduction circuit can reduce video noise without causing ringing or other distortion of the frequency modulated video signal.

Figure 10:
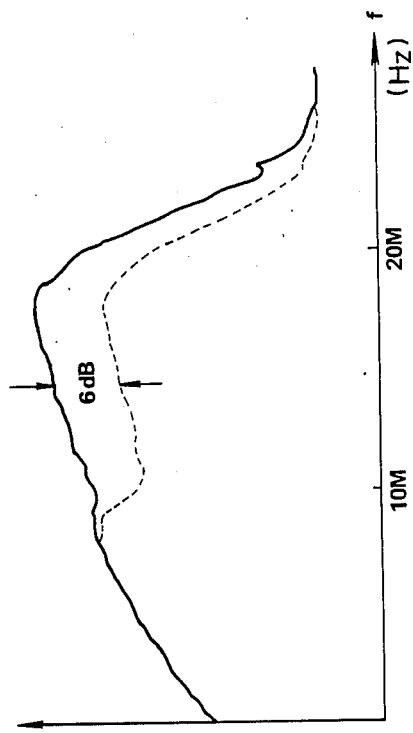
FIG. 10 is a graph showing the effect of frequency on video noise level.

FIG. 10 is a graph showing the effect of frequency on noise level. The solid curve relates to the prior art video signal recording apparatus and the broken curve relates to a video signal recording apparatus employing the video noise reducing circuit embodying the invention. It can be seen from a study of FIG. 10 that the video noise reduction circuit provides noise reduction of about 6 dB in the frequency range of 10 MHz to 20 MHz.

Although the invention has been described in connection with a high definition home videotape recorder, it is to be noted that the invention could readily be applied to other videotape recorders adapted to FM modulate a luminance signal before it is recorded on a magnetic recording medium. In addition, although the invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A video noise reduction system for use in a recording apparatus adapted to record red, blue and green primary color component video signals on a plurality of separate tracks of a magnetic recording medium, comprising:

means for frequency modulating the red and blue primary color component video signals and recording the frequency modulated signals on separate tracks of the magnetic recording medium;

matrix circuit means for matrixing the red, blue and green primary color component video signals to provide a wide-band luminance signal;

band splitter circuit means connected to the matrix circuit means for splitting the wide-band luminance signal into lower-band and upper-band luminance signals;

means connected to the band splitter circuit means for emphasizing low level components of the upper-band luminance signal to produce a level emphasized upper-band luminance signal;

adder circuit means for adding the lower-band luminance signal and the level emphasized upper-band luminance signal to produce an added luminance signal;

means connected to the adder circuit means for time-base expanding the added luminance signal and for separating the time-base expanded luminance signal into a plurality of narrow-band luminance signals; and means for frequency modulating the narrow-band luminance signals and recording the frequency modulated narrow-band luminance signals on separate tracks of the magnetic recording medium.

2. The video noise reduction system as claimed in claim 1, wherein the band splitter circuit means includes low pass filter means connected to the matrix circuit means, the low pass filter means having a cutoff frequency corresponding to a lowermost frequency of the upper-band luminance signal for passing the lower-band luminance signal, delay circuit means connected to the matrix circuit means for delaying the wide-band luminance signal to correspond to the lower-band luminance signal, and subtracter means for subtracting the lower-band luminance signal fed from the low pass filter means from the wide-band luminance signal fed from the delay circuit means.

3. The video noise reduction system as claimed in claim 2, wherein the low pass filter means has a cutoff frequency of about 10 MHz.

4. The video noise reduction system as claimed in claim 1, wherein the wide-band luminance signal has a cutoff frequency of about 20 MHz and the narrow-band luminance signals have a cutoff frequency of about 10 MHz.

* * * * *